March 6, 1951 H. H. WOLFE ET AL 2,544,121
HOSE COILING DEVICE
Filed Aug. 2, 1948 2 Sheets-Sheet 1
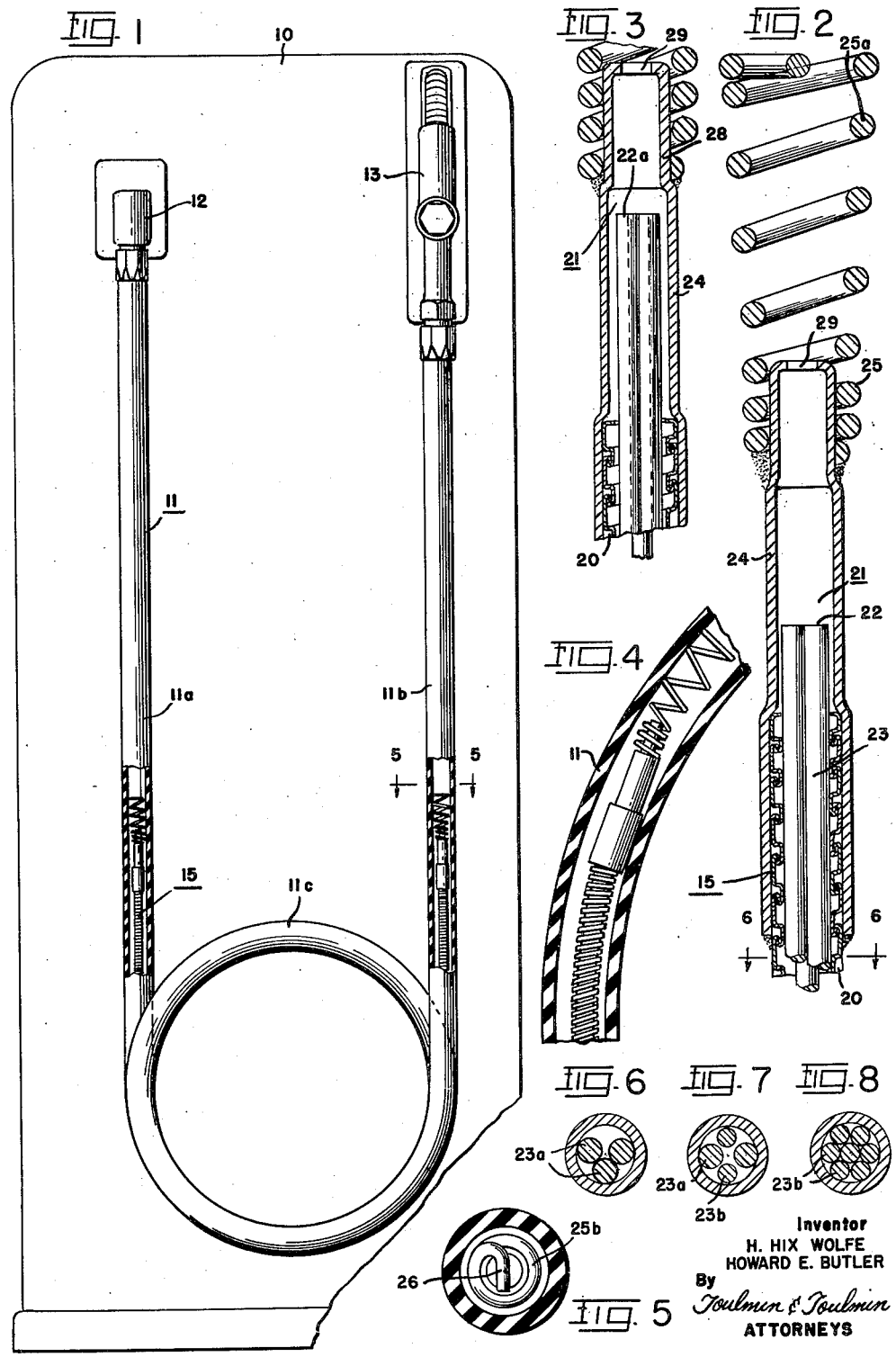
Inventor
H. HIX WOLFE
HOWARD E. BUTLER
By
Toulmin & Toulmin
ATTORNEYS

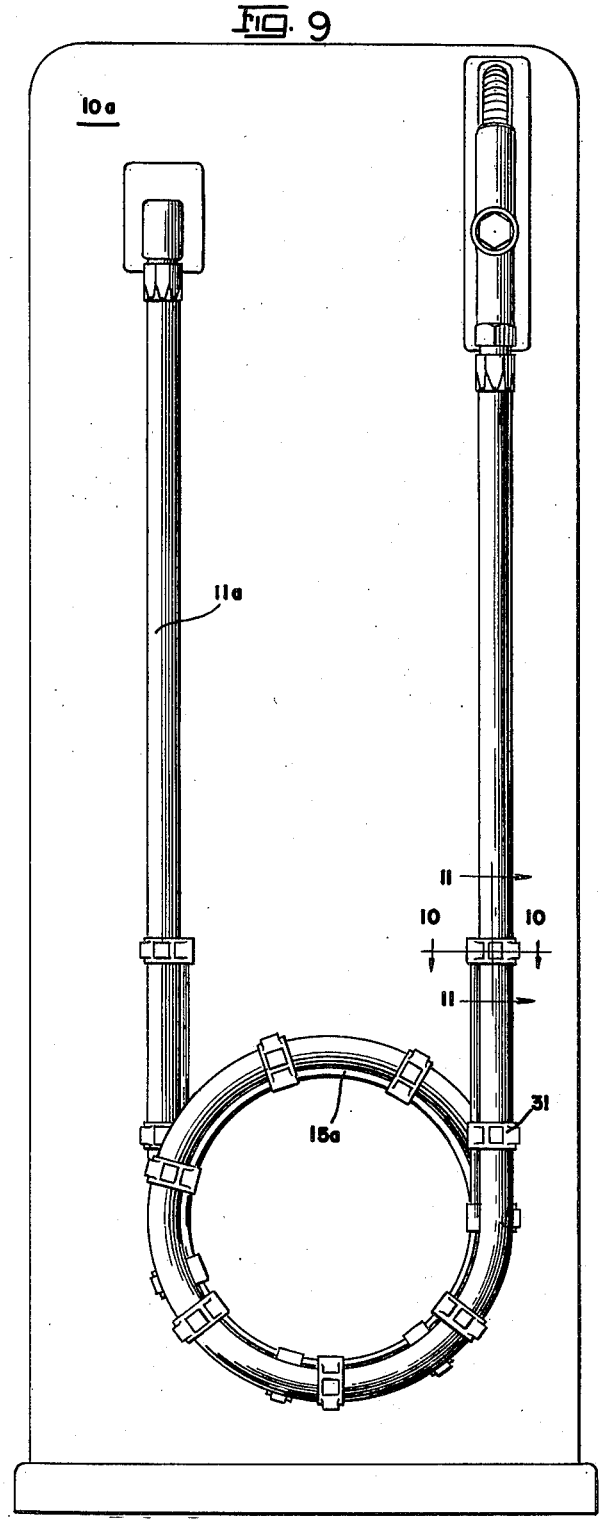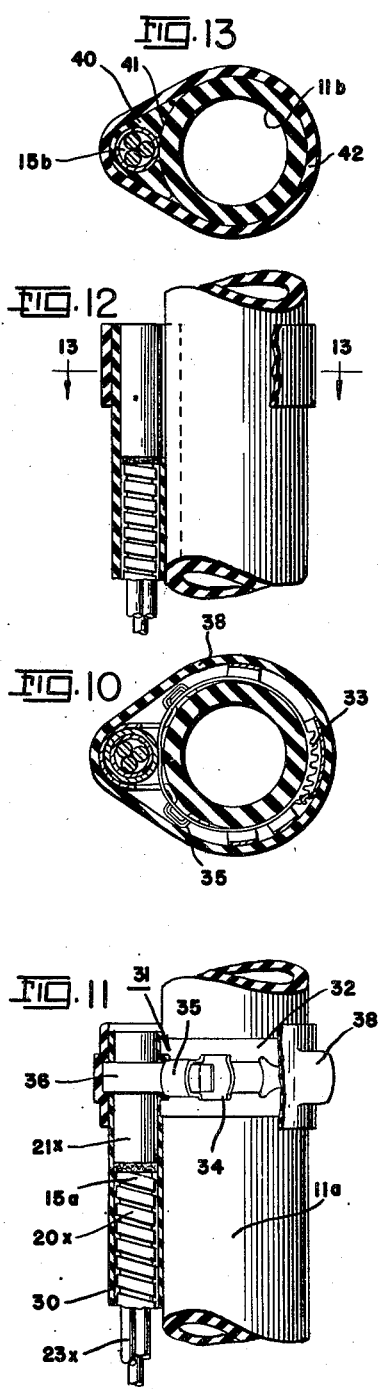

Patented Mar. 6, 1951

2,544,121

UNITED STATES PATENT OFFICE 2,544,121

HOSE COILING DEVICE

H. Hix Wolfe and Howard E. Butler, Dayton, Ohio, assignors to The Dayton Pump and Mfg. Company, Dayton, Ohio, a corporation of Ohio Application August 2, 1948, Serial No. 41,986

6 Claims. (Cl. 138—61)

This invention relates to a dispensing hose that is particularly adapted for use on a gasoline dispensing pump. However, the device has other uses than the one specifically disclosed and described herein.

In many places flexible hose is used for conducting liquids and gases from one place to another under such conditions that it is desirable to have a hose that is quite variable in its length so that the dispensing end of the hose can be placed at varying distances from the dispensing unit. However, it is not desirable to have any substantial length of hose lying on floor or the ground, hence there has been a considerable problem in providing devices that will take care of extra length of hose.

As for example, it is conventional practice to provide a U-shaped hose loop on a gasoline dispensing pump, and to hang the loop on the outside of the pump casing. One end of the hose loop is fastened to the dispensing outlet of the dispensing pump and the opposite end of the hose loop carries a dispensing nozzle. Various devices are provided for supporting the dispensing nozzle on the pump casing. Thus, in an arrangement such as this, only a determined length of hose can be used, without causing the hose to drag on the ground. The length of hose that is available for use in this kind of an arrangement is that which is substantially equal to twice the height of the dispensing pump.

Under many conditions of usage of a gasoline dispensing hose arranged in the conventional manner, the hose is of a sufficient length to reach the inlet opening of the gasoline tank of an automobile that is stationed alongside the dispensing pump. However, there are many situations in which the conventional length of U-shaped hose loop is insufficient to meet the condition and reach the filling opening of the gasoline tank of an automobile.

For example, the motorist may have pulled in on the wrong side of the pump, or the filling opening of the automobile may be on the far side of the automobile relative to the pump, or the motorist may not have pulled into just the right position that the conventional length of hose is sufficient to reach the filling opening of the gasoline tank.

Under these conditions, and others, to eliminate inconvenience to the motorist in moving the automobile, it is quite essential that the dispensing hose have a length greater than the normal length.

Many complex arrangements have been created in the past for meeting the problem such as placing the hose reel within the dispensing cabinet that will store an extra length of hose, or a U-shaped hose loop has been placed inside the cabinet which can be called upon in case an extra length of hose is required.

However, all of these prior art devices have required the design and development of special dispensing units and cabinets for the same, for the purpose of housing the extra length of dispensing hose. This has added considerably to the cost of the dispensing pump, and the devices have all been hard to operate because of the great amount of hose that is required to be handled.

It is therefore an object of this invention to provide a flexible hose coiling device that will permit the use of an extra-length flexible hose on a dispensing cabinet, all of which hose will be located on the outside of the cabinet, and which can be used on any dispensing pump regardless of make, construction or design.

It is still another object of the invention in accomplishing the objective of the foregoing object in providing a flexible hose with a flexible spring hose coiling device that is laid parallel to at least a portion of the length of the flexible hose for causing that portion of the hose to be arranged in a flexible hose loop which can be extended and retracted without causing the hose to drag on the ground.

It is still a further object of the invention in accomplishing the objectives of the foregoing objects to provide a flexible coiled spring that can be placed either inside or outside the hose in engagement with the same for causing the hose to make at least one complete hose loop which can be extended and retracted merely by pulling on the end of the hose in the normal manner that a station attendant would use a conventional hose.

It is still another object of the invention to provide a hose coiling device to accomplish the foregoing object wherein the device is placed within the dispensing hose and is free to move within the hose to eliminate any torque action that might develop during extension and retraction of the spring coil device.

It is still another object of the invention in accomplishing the foregoing object to provide a spring coil hose coiling device that is constructed in such a manner that it will not abrade the interior of a flexible hose.

Another object of the invention is to provide a spring coil hose coiling device that may be attached to the exterior of a flexible hose for establishing and maintaining at least one complete hose loop in the flexible hose.

These and other objects of the invention may be obtained from a device that is disclosed and described herein.

In the drawings:

Figure 1 is an elevational view of a gasoline dispensing unit illustrating the manner of use of the device of this invention, and further illustrating the device positioned inside the flexible hose.

Figure 2 is an enlarged cross-sectional view of one end of the hose coiling device.

Figure 3 is an enlarged cross-sectional view of the opposite end of the hose coiling device.

Figure 4 is a cross-sectional view of a portion of a flexible hose illustrating the use of the hose coiling device therein.

Figure 5 is a transverse cross-sectional view taken along line 5—5 of Figure 1.

Figure 6 is a transverse cross-sectional view taken along line 6—6 of Figure 2.

Figure 7 is a transverse cross-sectional view similar to Figure 6 but illustrating a different wire core arrangement, while Figure 8 illustrates a further modification of a wire core arrangement.

Figure 9 is an elevational view of a dispensing cabinet similar to Figure 1 but illustrating the use of the hose coiling device on the exterior of a flexible hose.

Figure 10 is a transverse cross-sectional view taken along line 10—10 of Figure 9.

Figure 11 is a vertical cross-sectional view, taken along line 11—11 of Figure 9, but with certain parts shown in elevation.

Figure 12 is a vertical cross-sectional view of a modified construction illustrating the use of the device on the exterior of a flexible hose.

Figure 13 is a transverse cross-sectional view taken along line 13—13 of Figure 12.

In Figure 1 there is illustrated a gasoline dispensing pump 10 that is provided with a gasoline dispensing hose 11. The hose 11 is connected to a dispensing outlet 12 positioned adjacent the top of the casing of the pump 10, in any conventional manner. The opposite end of the hose 11 carries a dispensing nozzle 13 that is removably supported on the casing of the pump 10 adjacent the top wall thereof in any conventional manner.

In conventional practice, the dispensing hose 11 would hang from the dispensing outlet 12 down toward the bottom wall of the pump 10 and then up to the nozzle 13 in a U-shape. This U-shape would provide only a determined length of hose that could be used to place the nozzle 13 a determined distance from the dispensing pump 10.

In this invention, however, the dispensing hose 11 has the two substantially vertical leg portions 11a and 11b that are connected together by at least one full hose loop 11c.

A spring wire coiling device 15 is placed within the hose 11 in such a manner that the ends of the coiling device 15 are disposed in the vertical leg portions 11a and 11b of the flexible hose 11. The spring wire that connects the ends of the coiling device passes through the hose loop 11c, thereby establishing the hose loop 11c and maintaining it at all times. The spring coiling device 15 is constructed so that it forms a complete loop like that of the hose loop 11c so that upon insertion of the device into the hose 11, which is a conventional flexible hose length, the loop 11c is established by the spring coiling device and thereafter maintained in the hose.

It will be apparent that the device of this invention will cause absolutely no difference in handling of the hose by the station attendant. It is merely necessary for the attendant to stretch the hose to its full length by pulling it outwardly if desired, and as soon as the nozzle 13 is returned to its support on the pump, the hose loop 11c will be reestablished in the hose.

It will also be apparent that the device can be used on any dispensing pump regardless of make or style and can be used in any flexible dispensing hose.

To insert the spring coiling device of this invention into a flexible hose, it is only necessary to thread a wire or heavy cord through a length of hose and then pull the spring coiling device into the hose at substantially the center portion thereof. Of course, the hose length will be preferably held straight during insertion of the device, and upon release of the hose, the hose loop 11c will be established in the flexible hose.

It will also be noted that the device in the preferred form of the invention is not in any way attached to the hose and therefore the torque developed by rotation of the spring within the hose when the hose is extended or retracted will not in any way cause torque in the flexible hose which would tend to rotate the nozzle 13 in the hands of an attendant.

The spring wire coiling device 15 consists of a flexible metal sheath 20 that may be an interlocking metal spiral member of conventional type. However, any suitable flexible cable may be used for the sheath 20.

At each end of the sheath 20 there is a rigid portion generally designated by the numeral 21 which receives the end 22 of a wire spring 23.

In the form of the invention shown in Figs. 2 and 3 the rigid portion at the end of the metal sheath 20 consists of a hollow metal sleeve 24 that is suitably secured on the end of the sheath 20.

It might be stated here that both ends of the spring wide coiling device, illustrated in Figs. 2 and 3, are of like construction, thus description of one of the ends only is necessary, but corresponding reference numerals are placed on the end of the device illustrated in Fig. 3.

The free end of the metal sleeve 21 carries a truncated cone-shaped coiled protective or guard spring 25, the small end of the cone engaging the end of the sleeve 24 and suitably secured thereto.

The free end 25a of the spring 25 is formed as a closed loop 25b, more particularly shown in Fig. 5, with the end 26 of the spring 25 extending inwardly of the closed loop 25a. This arrangement is important to prevent the end of the spring from gouging the interior of the flexible hose when the hose is placed, as shown in Figure 4. Also, the spring 25 prevents the rigid end portion 21 from gouging the hose, as shown in Figure 4. The purpose of the spring 25 is to cause the hose 11 to take a relatively long radius of flex at the end of the spring coiling device, thus preventing the hose 11 from breaking over the end of the spring coiling device, which would tend to kink the hose at this point and cause an early rupture of the hose.

The spring wire core 23 extends throughout the length of the sheath 20 and has a complete loop in its length which forms the loop 11c of the hose 11 as illustrated in Figure 1. The opposite ends 22 and 22a of the core 23 terminate in the rigid portions 21, or sleeve 24 on the end of the sheath 20, the core 23 being of such length that with one end of the core 23 in the end extremity of the rigid portion 21 or sleeve 24, the opposite end will not be withdrawn from the rigid portion or sleeve. Thus, the end of the spring core may always slide freely in the rigid portion or sleeve without gouging the flexible portion of the sheath 20 which would tend to cause an early rupture of the flexible sheath.

Movement of the spring core 23 may be regulated in its endwise movement either by means of a reduced diameter portion 28 of the sleeve 24, or by the end of the sleeve itself.

The sleeves 24 have an opening 29 therein to allow movement of fluid within the sleeve, and thus prevent any hydraulic locking of the device.

The spring wire core 23 may consist of a single wire, or of a plurality of large wires 23a as shown in Fig. 6, or of a plurality of smaller wires 23b as shown in Fig. 8, or of a combination of large wires 23a and small wires 23b as shown in Fig. 7, depending upon the degree of flexibility desired in the spring wire coiling device.

In Figure 9 there is illustrated the spring wire coiling device placed upon the flexible hose 11a of the dispensing pump 10a. In this arrangement the spring wire coiling device 15a is constructed like that of the device shown in Figs. 1 to 6, with the exception that the spring 25 is not used on the end of the rigid portion 21 of the coiling device.

The coiling device 15a consisting of the flexible sheath 20x, the rigid end portion 21x or sleeve, and the core 23x are assembled together in the same manner as described with reference to Figs. 2 and 3. The coiling device 15a in this instance is covered with a rubber-like coating or covering 30 to prevent the device scratching the finish on motor vehicles when the hose engages them.

The device 15a is secured in parallel engaging relationship with the hose 11a by means of a series of clamps 31 that are spaced longitudinally along the length of the coiling device 15a.

The clamps 31 may be of any suitable construction, but as illustrated herein, consist of a metal band 32 that is closed by a ratchet connection 33. The band 32 is provided with slotted areas 34 and raised portions 35.

A clip 36 is placed over the hose coiling device and is formed to fit under the raised portions 35 of the clamp, as shown in Fig. 10 so that when the clamp is drawn together the clips 36 will secure the device 15a on the hose 11a.

A rubber-like band 38 may be placed around the clamps 31 to prevent them from scratching the finish of a motor vehicle.

In Figures 12 and 13 there is illustrated a slightly modified arrangement of the hose coiling device for attaching it to the outside of a hose 11b. In this arrangement the spring coiling device 15b is enclosed with a rubber sheath 40 that is substantially triangular in shape and having an arcuate surface 41 adapted to fit the arcuate surface of the hose 11b, as shown in Fig. 13. The sheath 40 is split longitudinally so that it can be slipped over the hose coiling device 15b.

The sheathed coiling device 15b is laid against the side of the hose 11b and a plurality of rubber-like bands 42 may encircle the device and the hose to secure them together.

While the apparatus disclosed and described herein illustrate preferred forms of the invention, yet it is understood that the apparatus is capable of mechanical alteration without departing from the spirit of the invention, and that all modifications that fall within the scope of the appended claims are intended to be included herein.

Having thus fully described our invention, what we claim as new and desire to secure by Letters Patent is:

1. A flexible hose coiling device for insertion into a flexible hose which conducts fluids for establishing and maintaining a pre-set resilient loop in the flexible hose comprising, a flexible hollow sheath, a rigid sleeve secured on each end of said sheath, and a spring wire core having a pre-set spring loop therein extending through said sheath with the opposite ends thereof terminating in said sleeves and imparting to the sheath the pre-set loop of the core, said core comprising a plurality of unattached parallel wires freely movable relative to each other and relative to said sheath.

2. A flexible hose coiling device for insertion into a flexible hose which conducts fluids for establishing and maintaining a pre-set resilient loop in the flexible hose comprising, a flexible hollow sheath having rigid portions at opposite ends thereof, and a spring wire core having a pre-set spring loop therein extending through said sheath with the opposite ends thereof terminating in said rigid portions and imparting to the sheath the pre-set loop of the core, said spring wire core being of a length that neither end thereof is drawn inwardly into said sheath out of said rigid portion thereof when one end of said wire core is in the extreme end position of its cooperating rigid sheath portion.

3. A flexible hose coiling device for insertion into a flexible hose which conducts fluids for establishing and maintaining a pre-set resilient loop in the flexible hose comprising, a flexible hollow sheath, a rigid sleeve secured on each end of said sheath, a spring wire core having a pre-set spring loop therein extending through said sheath with the opposite ends thereof terminating in said sleeves and imparting to the sheath the pre-set loop of the core, said wire core being of a length that neither end thereof is drawn into said flexible sheath out of said sleeve when one of the ends of said core is in the end extremity of its cooperating sleeve, and a coil spring secured on the free end of each of said sleeves and projecting a substantial distance therebeyond.

4. A flexible hose coiling device for insertion into a flexible hose which conducts fluids for establishing and maintaining a pre-set resilient loop in the flexible hose comprising, a flexible hollow sheath, a rigid sleeve secured on each end of said sheath, a spring wire core having a pre-set spring loop therein extending through said sheath with the opposite ends thereof terminating in said sleeves and imparting to the sheath the pre-set loop of the core, said wire core being of a length that neither end thereof is drawn into said flexible sheath out of said sleeve when one of the ends of said core is in the end extremity of its cooperating sleeve, and a coil spring secured on the free end of each of said sleeves and projecting a substantial distance therebeyond, said coil spring having the free end thereof formed into a closed loop with the end of the spring pointed inwardly and into the closed loop.

5. A flexible hose coiling device for insertion into a flexible hose which conducts fluids for establishing and maintaining a pre-set resilient loop in the flexible hose comprising, an interlocking hollow metal spiral flexible sheath, a rigid hollow sleeve secured on each end of said sheath and having an end wall on the free end thereof at least partially closed, and a spring wire core having a pre-set spring loop therein extending through said sheath with the opposite ends thereof terminating in said sleeves and imparting to the sheath the pre-set loop of the core.

6. In combination, a flexible hose, and a flexible spring hose coiling device disposed in parallel engagement with a part of the length of said hose inside said hose and forming thereon and therewith at least one full resilient hose loop; said device comprising, a flexible hollow sheath having rigid portions at opposite ends thereof, a spring wire core having a pre-set spring loop therein extending through said sheath with the opposite ends thereof terminating in said rigid portions and imparting to the sheath the pre-set loop of the core, and a flexible protector secured on the free end of each of said rigid portions and projecting a substantial distance therebeyond for engagement with the inside wall of said hose and prevent the free ends of said rigid portions from engaging said hose upon flexing of said hose.

H. HIX WOLFE.
HOWARD E. BUTLER.

REFERENCES CITED

The following references are of record in the file of this patent:

UNITED STATES PATENTS

| Number | Name | Date |
|---|---|---|
| 790,971 | Nicholls | May 30, 1905 |
| 805,579 | Patchen | Nov. 28, 1905 |
| 865,355 | Callmann et al. | Sept. 10, 1907 |
| 2,032,753 | James | Mar. 3, 1936 |
| 2,251,340 | Moore | Aug. 5, 1941 |
| 2,277,864 | Horvath | Mar. 31, 1942 |
| 2,322,966 | Oberly | June 29, 1943 |
| 2,327,475 | Waugh | Aug. 24, 1943 |

FOREIGN PATENTS

| Number | Country | Date |
|---|---|---|
| 252,652 | Great Britain | June 3, 1926 |
| 57,563 | Sweden | Sept. 23, 1924 |